(12) United States Patent
Baissus

(10) Patent No.: US 6,449,470 B1
(45) Date of Patent: Sep. 10, 2002

(54) METHOD AND DEVICE FOR ESTIMATING THE FREQUENCY OFFSET IN A SIGNAL RECEIVED BY A MOBILE-TELEPHONE DEMODULATOR

(75) Inventor: Eric Baissus, Le Rouret (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/089,791

(22) Filed: Jun. 3, 1998

(51) Int. Cl.$^7$ .................................................. H04B 1/10
(52) U.S. Cl. ....................... 455/296; 455/550; 455/110; 331/16; 332/123; 375/375; 375/346
(58) Field of Search .................................. 455/276, 550, 455/227; 329/318–321, 304–310, 349–353; 331/16, 17, 25–29; 332/117, 118, 123, 149, 150, 159

(56) References Cited

U.S. PATENT DOCUMENTS

| | | | | |
|---|---|---|---|---|
| 4,633,485 A | * | 12/1986 | Betts et al. | 375/346 |
| 4,669,090 A | * | 5/1987 | Betts et al. | 375/222 |
| 4,963,839 A | * | 10/1990 | Stacey | 331/17 |
| 5,060,180 A | * | 10/1991 | Kingston et al. | 708/306 |
| 5,452,327 A | * | 9/1995 | Barham et al. | 375/149 |
| 5,646,968 A | * | 7/1997 | Kovacs et al. | 375/375 |
| 5,748,045 A | * | 5/1998 | Tateishi | 331/17 |
| 5,748,046 A | * | 5/1998 | Badger | 331/17 |

FOREIGN PATENT DOCUMENTS

| | | |
|---|---|---|
| EP | 0 108 358 A | 5/1984 |
| EP | 0 252 500 A | 1/1988 |
| EP | 0 533 208 A | 3/1993 |
| EP | 0 564 361 A | 10/1993 |

OTHER PUBLICATIONS

Matsumoto et al.: "VLSI implemented 60 Mb/s QPSK/QQPSK burst digital demodulator for radio application".
IEICE Transactions On Electronics., vol. E77–C, No. 12, Dec. 1994, pp. 1873–1880, XP000497018 Tokyo, JP.
Fines, Aghvami: "A comparison study of low bit rate DE–QPSK and TCM 8–PSK fully digital demodulators over a land mobile satellite link".
IEEE Global Telecommunications Conference 1990, Dec. 2–5, 1990, pp. 387–392, XP000218759 New York, US.

* cited by examiner

Primary Examiner—Tracy Legree
Assistant Examiner—Charles Craver
(74) Attorney, Agent, or Firm—William B. Kempler; Frederick J. Telecky, Jr.

(57) ABSTRACT

Device for estimating the frequency offset in a signal received by a differential demodulator of a mobile-telephone set, intended for implementing the method according to one of claims 1 to 3, characterized in that it has means (1) for calculating an error signal $\epsilon$ on the basis of the phase $\phi$ of the output signal of the demodulator and the ideal phase $\phi_o$ of this signal, means (4) for establishing the absolute value (ABS) of the error signal $\epsilon$, means (2, 5, 7) for calculating an estimate of the average of the error signal $\epsilon$ calculated over a certain number of samples, from which estimate $n_{FO-RAW}$ bits are taken, means (3, 6, 8) for calculating an estimate of the average of the absolute value of the error signal $\epsilon$ over a certain number of samples, from which estimate $n_{Q-RAW}$ bits are taken, and means (10) for modelling a frequency-offset function $\Omega$(FO-RAW, Q-RAW) on the basis of the said estimates.

10 Claims, 3 Drawing Sheets

METHOD AND DEVICE FOR ESTIMATING THE FREQUENCY OFFSET IN A SIGNAL RECEIVED BY A MOBILE-TELEPHONE DEMODULATOR

The present invention relates to a device for estimating the frequency offset, in particular for a mobile-telephone demodulator.

Frequency modulation is the modulation technique most widely used in mobile radio systems.

In frequency modulation, the signals have all their information contained in the phase or the frequency of the carrier.

In order to recover the data, the demodulator which is used must estimate the phase or the frequency of the signal. If the carrier frequency is not exactly the expected frequency (because of a difference in frequency between the frequency of the oscillators of the transmitter and of the receiver), this may lead to an inaccuracy, and therefore increase the error rate of the demodulator.

It will be assumed below that the oscillator of the receiver is perfect but the oscillator of the transmitter is imperfect. In reality, both are imperfect.

One of the great problems with radio systems is that of reducing the impact of the frequency error of the received signal by compensating for it locally.

Indeed, in order to reduce the total system cost, manufacturers are reluctant to use oscillators which are accurate and therefore expensive.

There are usually two ways of compensating for the frequency error of the carrier:

a) the frequency of the oscillator of the receiver is changed in order to adapt it to the frequency of the carrier.
This involves external compensation using a VTCXO;
b) the frequency is corrected directly inside the demodulator. This therefore involves internal compensation.

In both cases, it is necessary to have a good estimate of the frequency error in a probably imperfect environment (low signal/noise ratio) in a fairly short time.

Furthermore, if the receiver successively receives signals from different transmitters, it must frequently estimate new frequency errors.

In this case, the frequency error estimator must give a reliable estimate on the basis of a very small number of samples.

An aspect of the invention is to create a very efficient frequency error estimator used with a differential phase demodulator.

A further aspect of the invention is to create a frequency error estimator which is particularly well-suited to a $\pi/4$ QPSK demodulator, having four-state phase modulation with a jump of $\pi/4$, dedicated to wireless application such as PHS and PDC mobile telephones.

The invention therefore relates to a method for estimating the frequency offset in a signal received by a demodulator of a mobile-telephone set, characterized in that it includes the steps consisting in:
calculating an error signal $\epsilon$ on the basis of the phase $\phi$ of the output signal of the demodulator and of the ideal phase $\phi_o$ of this signal;
calculating estimates of the averages of the signal $\epsilon$(FO-RAW) and of its absolute value (Q-RAW) over a certain number of samples, taking a certain number of bits ($n_{FO\text{-}RAW}$, $n_{Q\text{-}RAW}$) of these estimates and applying them to means for modeling a function $\Omega$(FO-RAW, Q-RAW) representing the frequency offset.

The invention will be understood more clearly with the aid of the following description, given solely by way of example and with reference to the appended drawings, in which.

In the following description, the impact of the frequency error on the value of the phase of the demodulated samples will firstly be explained.

The principle of the invention will then be described.

Lastly, the frequency error estimator used in PHS mobile telephone applications will be described.

The influence of the frequency error will firstly be examined by studying the PSK modulation.

In the case of phase modulation, the information is contained in the phase of the signal:

$$U(t)=A\cos(2\pi f_o t+\phi(t))$$

where
$U(t)$ is the modulated signal
$f_o$ is the carrier frequency
$\phi(t)$ is the phase of the signal, as a function of the information.

At the sampling point, $\phi(kT)$ generally belongs to a certain group of possible values.

Figure 1:
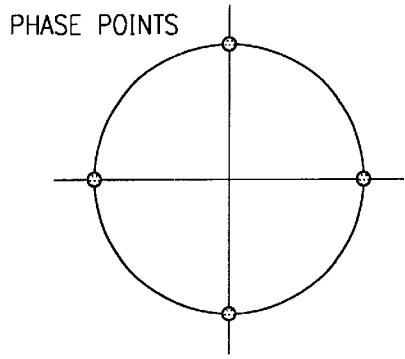
FIG. 1 is a diagram representing the phase points of a QPSK modulation.

FIG. 1 shows four QPSK modulation phase points.

The impact of the frequency error will now be considered.

There are in principle two ways of demodulating the signal:

a) multiplying the received signal with an internal frequency tuned to the expected carrier frequency (coherent demodulation),
b) multiplying the received signal with the same signal stored one symbol in front (differential demodulation)

In the case of coherent demodulation, the following is obtained:

$$M(t)=A\cos(2\pi f_1 t+\phi(t))\times B\cos(2\pi f_0 t+\phi_o),$$

where
$M(t)$ is the first step in the demodulation
$f_o$ is the carrier frequency
$f_1$ is the carrier frequency increased by a frequency error ($f_1=f_o+f_{error}$)
$\phi(t)$ is the phase of the signal as a function of the information
$\phi_o$ is the initial phase of the internal signal.
It is assumed that $\phi_o=0$ in order to simplify the notation.

$$M(t)=AB[\cos(2\pi(f_1+f_0)t+\phi(t))+\cos(2\pi(f_1-f_0)t+\phi(t))]=X+Z$$

The first expression X is filtered in the demodulator.
The second expression Z contains the information.
When there is no error on the frequency of the transmitter, $Z=\cos(\phi(t))$.

When there is an error on the frequency of the transmitter Z=cos (2πf$_{error}$ t+φ(t)).

In the case of incoherent differential demodulation, the following equation is obtained:

$$M(t)=A \cos(2\pi f_1 t+\phi(t))*B \cos(2\pi f_1(t+T)+\phi(t+T))$$

in which

M(t) is the first step in the demodulation, $f_1$ is the carrier frequency plus a frequency error ($f_1=f_\phi+f_{error}$), φ(t) is the phase of the signal, depending on the information, T is the period of the symbol:

$$M(t)=AB[\cos(2\pi f_1(2t+T)+\phi(t))+\phi(t+T))+\cos(2\pi f_1 T+\phi(t+T)-\phi(+))]=X+Z$$

The first expression X is filtered in the demodulator.

The second expression Z contains the information.

When there is no error on the frequency of the transmitter, $Z=\cos(2\pi f_0 T+\phi(t+T)-\phi(t))$. $f_0$ and T are customarily chosen so that $T=n\times 1/f_\phi$.

In this case, $Z=\cos(\phi(t))$.

When there is an error on the frequency of the transmitter:

$$Z=\cos(2\pi f_{error} T+\phi(t+T)-\phi(t))$$

$$Z=\cos(\phi_e+\phi(t+T)-\phi(t))$$

where φe is a constant phase error due to the frequency error.

The impact of the frequency offset in the case of incoherent demodulation is thus a constant phase error.

This phase error can be corrected easily.

The role of the frequency offset error estimator is to give an estimate of $\phi_e$ as quickly as possible and with the best reliability, even in a highly unfavourable environment.

Figure 2:
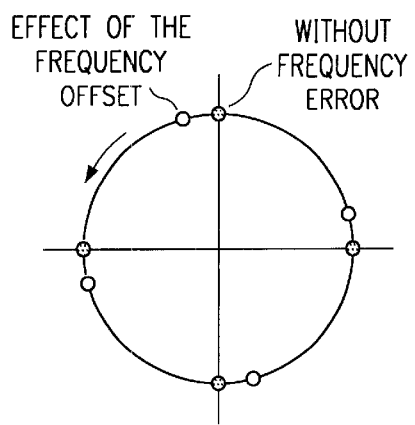
FIG. 2 is a diagram which is similar to that in FIG. 1 and shows the impact of the frequency offset on the differential QPSK demodulation.

The impact of the frequency offset on differential PSK demodulation is represented in FIG. 2.

The general use of a frequency offset estimator will now be described.

A normal demodulator calculates the in-phase and quadrature components I and Q of the signal in order to recover the data.

The effect of the frequency offset estimator on the signals I and Q will therefore be explained.

However, the principle remains the same if the demodulator directly estimates the phase of the signal or another monotonic function of the phase.

The example will be taken of π/4 QPSK modulation used in PHS, PDC, PACS systems, for example.

The principle is still valid with other differential demodulations of the PSK type.

The frequency offset estimator uses the error between the sample (white dot in FIG. 2) and the ideal sample (grey dot).

This error is referred to as ε.

Figure 3:
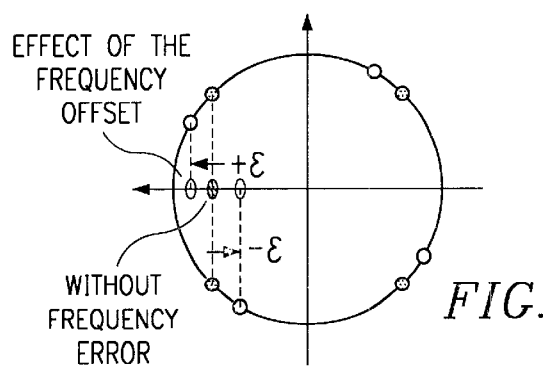
FIG. 3 is a diagram representing the effect of the frequency error on the in-phase component I of the signal in $\pi/4$ QPSK modulation.

As can be seen clearly in FIG. 3, in the case of estimating I and Q, it can be seen that the sign of the impact of a frequency offset depends on the quadrant in which the sample lies.

If the sample is in the grey part, the error on I is +ε.

If the sample is in the white part, the error is −ε.

The effect of the frequency error on the component I is represented in FIG. 3.

It will be assumed below that the sign is compensated so that the impact of the frequency error is always ε irrespective of the sample.

Figure 4:
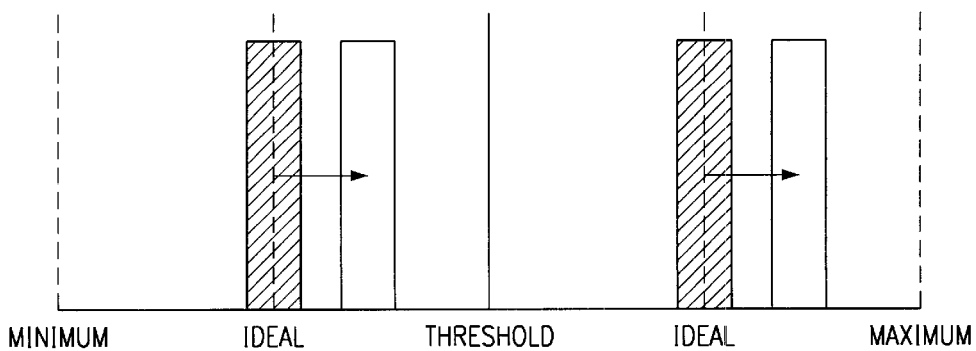
FIG. 4 is a histogram of the signal I.

In the case of π/4 QPSK modulation, the histogram of I (or Q) with or without offset under perfect conditions is represented in FIG. 4.

This explains why a normal offset estimator uses the average of the error ε to obtain an estimate of the frequency error. This estimate will be referred to below as FO-RAW=average (ε).

However, in the case of an unfavourable environment, for example in the presence of (additive) white gaussian noise (AWGN), the histogram of I becomes larger and demodulation errors occur, in particular in the case of a frequency offset error.

Figure 5:
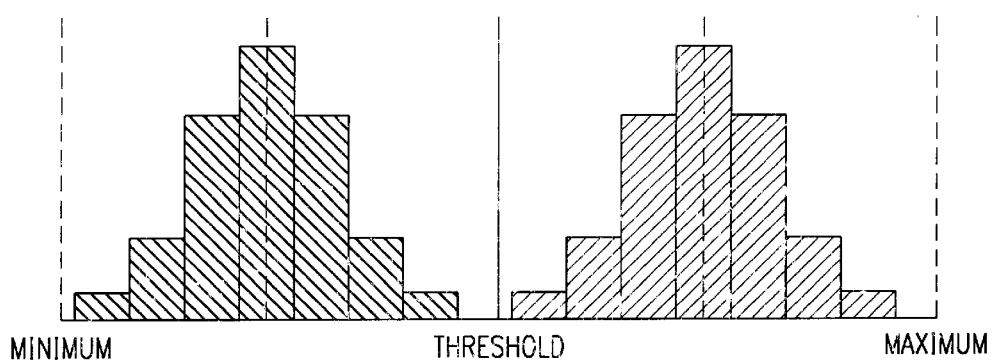
FIG. 5 is a diagram representing the histogram of I in a noisy environment, without frequency error.

FIG. 5 shows the histogram of the in-phase component I in a noisy environment and without frequency error.

When erroneous demodulation occurs, the error estimate ε also becomes erroneous.

Figure 6:
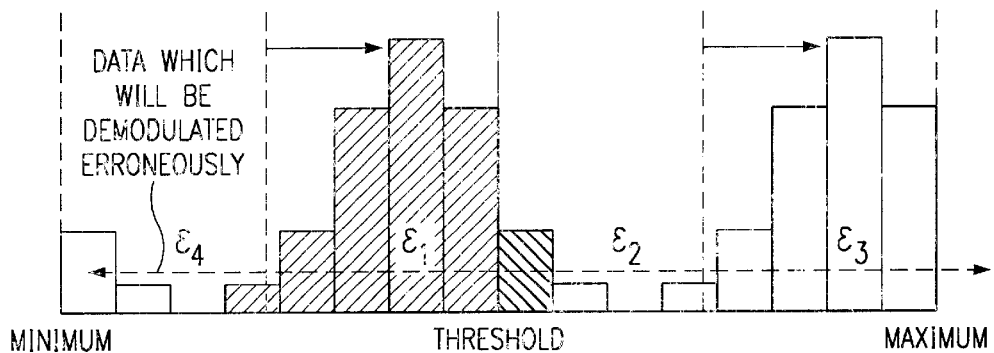
FIG. 6 is a diagram representing the histogram of I in a noisy environment, with frequency error.

In FIG. 6, the true error on the "dark" samples is ε1.

However, because of the erroneous demodulation, the error estimate is ε2.

FIG. 6 shows the histogram of I in a noisy environment with a frequency error.

Because of these errors, the estimate FO-RAW is less than that which is expected.

The error on FO-RAW increases with the frequency error and the amount of noise.

It can therefore be seen that the estimate FO-RAW depends on the frequency offset and also on the quality of the received signal.

FO-RAW=FO-RAW (frequency offset, quality)

The quality estimate will now be described.

It can be seen that it is important to evaluate the quality of the signal in order to obtain a reliable frequency offset estimate.

The usual way of estimating the quality of a signal is to evaluate the variance of the signal, that is to say to evaluate the average of the absolute value of the phase error, which is referred to as Q-RAW=average (ε).

In this estimator, the impact of a demodulation error is not so serious because the absolute value is used.

However, even in a highly favourable environment, the estimate Q-RAW is bound to increase with the frequency offset.

In the case of a large frequency offset, Q-RAW delivers a high value even if the quality of the signal is very good.

Figure 7:
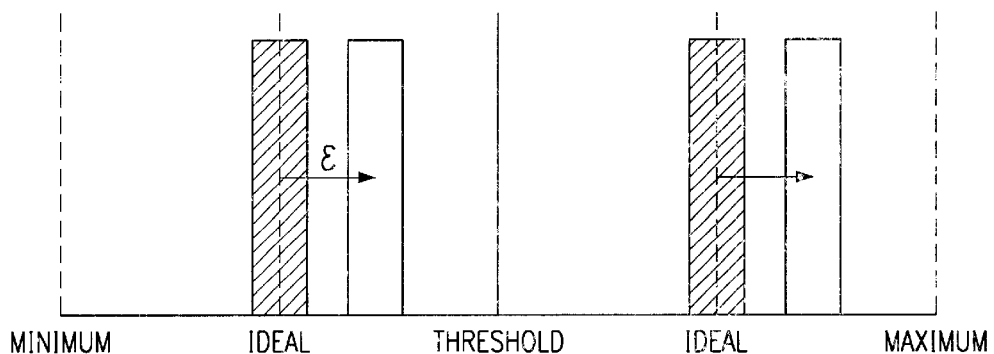
FIG. 7 is a diagram representing the impact of the frequency offset on the quality estimate.

FIG. 7 shows the impact of the frequency offset on the quality estimate.

The result of what has gone before is that the estimator Q-RAW depends on the quality of the signal and also on the frequency error.

Q-RAW=Q-RAW (frequency offset, quality).

According to the invention, the frequency offset information contained both in the signals FO-RAW and Q-RAW is used, and the quality information is removed.

To do this, it is necessary to evaluate the following function Ω.

Ω(FO-RAW, Q-RAW)=frequency offset.

An approximation of Ω is made by using a ROM memory. The ROM memory may, of course, be synthesized by combinatorial logic in order to obtain a more efficient embodiment.

For programming the ROM memory, there are two ways of evaluating the function Ω, that is to say calculating the best coefficients to be stored in the ROM.

Ω may be calculated directly using system equations.

In this case, all that needs to be done is to quantify the function Ω according to the possible values of Q-RAW and FO-RAW.

In most cases, it is difficult to define the function Ω explicitly, in particular when an attempt is made to take the effect of noise into account.

The coefficients could be calculated by simulation or by experimentation.

The best way is to fix the frequency error arbitrarily at a certain known value for each test n in a series of tests.

Let δn be the frequency error during test number n.

For this test number n, let FO-RAW$_n$ and Q-RAW$_n$ be the corresponding values of FO-RAW and Q-RAW.

Ω(FO-RAW, Q-RAW) is defined by the average value of all the δn such that FO-RAW=FO-RAW$_n$ and Q-RAW=Q-RAW$_n$.

In the case of a π/4 QPSK differential demodulator (four-state phase modulation with a jump of π/4), the invention is implemented as follows.

The demodulator provides the frequency offset estimator with an estimate of the in-phase and quadrature components I and Q of the signal which it has received.

These components I and Q are compared with the components $I_o$ and $Q_o$ of the ideal position.

The error ε on I is then estimated and corrected in order to remove the variation in sign according to the value Q of the sample, as indicated at the start of the description.

The estimates FO-RAW and Q-RAW are calculated over the amount of samples available.

With only 12 samples, the embodiment obtains a very good result even in an unfavourable environment.

$n_{FO-RAW}$ and $n_{Q-RAW}$ are respectively the number of bits used in FO-RAW and Q-RAW. $n_{freq.offset}$ is the number of bits in the estimate of the frequency offset.

The total dimension of the ROM is:

ROM dimension=$2^{(n_{FO-RAW}+n_{Q-RAW})} * n_{freq.offset}$

The ROM memory may be replaced by a logic circuit. In this case, the dimension of the embodiment may be improved considerably by virtue of the redundancy and the symmetry in Ω.

Figure 8:
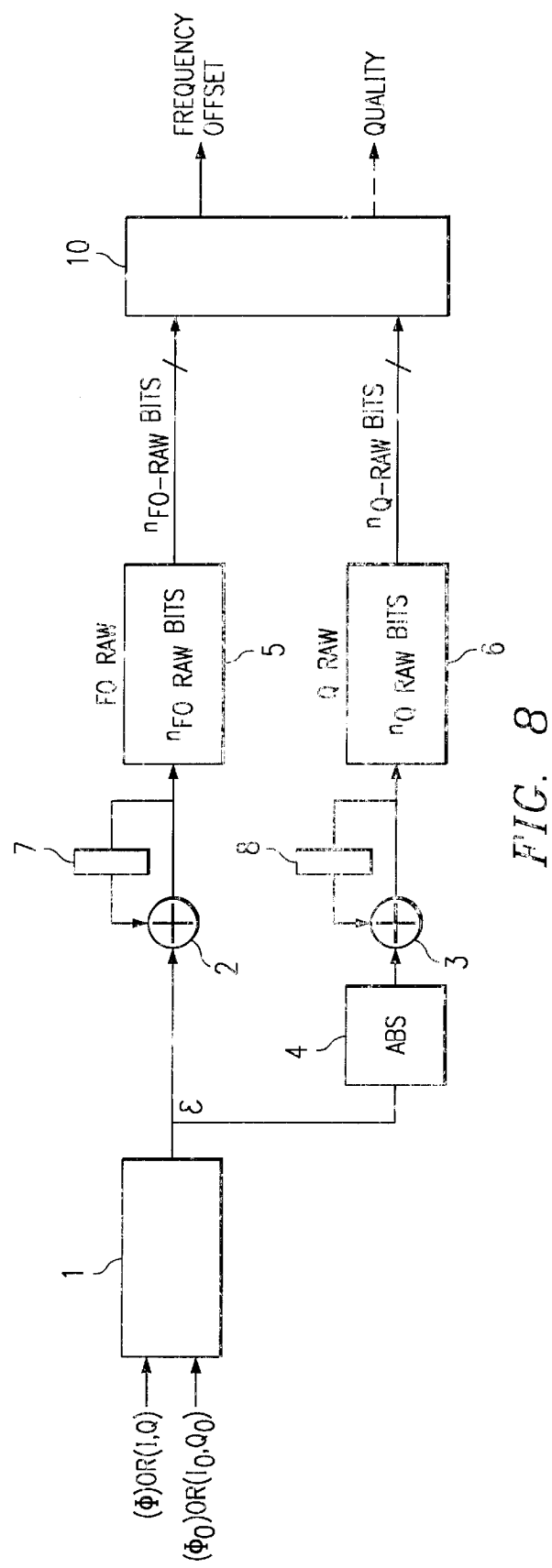
FIG. 8 is a block diagram of the circuit for estimating frequency offset according to the invention.

The circuit for estimating frequency offset according to the invention is represented in FIG. 8.

It comprises an error calculation circuit 1 which, on its inputs, receives the signals I, Q drawn from the transmitted signal and $I_o$, $Q_o$ corresponding to the ideal phase.

The circuit 1 is connected at its output to a first adder 2 directly and to a second adder 3 via a circuit 4 for establishing the absolute value ABS of the error signal ε appearing at the output of the error calculation circuit 1.

The output of the first adder 2 is connected to an FO-RAW circuit 5 intended to take n FO-RAW bits from the available FO-RAW bits.

The output of the second adder 3 is connected to the input of a Q-RAW circuit 6 intended to take n Q-RAW bits from the available Q-RAW bits.

The outputs of the first and second adders 2 and 3 are furthermore looped back onto the second inputs via respective one-symbol delay circuits 7, 8.

The outputs of the circuits 5 and 6 are connected to corresponding address inputs of a ROM memory 10 which is programmed in the manner indicated above and which constitutes means for modelling the function Ω(FO-RAW, Q-RAW).

The frequency offset signal appears at the output of this ROM memory.

It should be noted that the same embodiment may be used to obtain a quality estimate independent of the frequency error.

Certain results given by the circuit for estimating the frequency offset according to the invention are given below.

In the case of the embodiment in FIG. 8, the result of the frequency offset is given with an accuracy of 3 ppm.

The application range is −9 ppm to 9 ppm.

The method and the device for estimating frequency offset which has just been described is particularly well-suited to wireless applications characterized by a short learning sequence and an unfavourable communication environment.

The algorithm firstly estimates the average of the phase error of the demodulated signal and its variance.

By virtue of these two statistical parameters and the involvement of the ROM memory or combinatorial logic, a highly reliable frequency offset estimate is obtained, with means which have a very low degree of complexity.

The efficiency of the method and of the device of the invention makes it possible to correct the frequency within a packet, and not to wait for the next data packet in order to apply the estimate.

This characteristic is highly beneficial in the case of demodulating a plurality of base stations which have different frequency offsets.

What is claimed is:

1. Method for estimating the frequency offset in a signal received by a demodulator of a mobile-telephone set, comprising the steps of:

calculating an error signal ε on the basis of the phase φ of the output signal of the demodulator and of the ideal phase $φ_o$ of this signal;

calculating estimates of the averages of the signal ε(FO-RAW) and of its absolute value (Q-RAW) over a predetermined number of samples, taking a predetermined number of bits ($n_{FO-RAW}$, $n_{Q-RAW}$) of these estimates and applying them to means for modelling a function Ω(FO-RAW, Q-RAW) representing the frequency offset;

wherein the modelling of the function Ω(FO-RAW, Q-RAW) representing the frequency offset consists in arbitrarily fixing the frequency error δn at a certain known value for each n of a series of tests, FO-RAW$_n$ and Q-RAW$_n$ being the corresponding values of FO-RAW and Q-RAW, and in defining the function Ω(FO-RAW, Q-RAW) by the average value of all the errors δn such that FO-RAW=FO-RAW$_n$ and Q-RAW=Q-RAW$_n$.

2. Method according to claim 1, wherein the output of the demodulator is formed by its in-phase component I and its quadrature component Q, and in that the error signal ε is calculated on the basis of these in-phase and quadrature components I and Q of the demodulated signal and of the in-phase and quadrature components $I_o$ and $Q_o$ corresponding to a signal having ideal phase.

3. Device for estimating the frequency offset in a signal received by a differential demodulator of a mobile-telephone set, intended for implementing the method according claim 1 comprising means (1) for calculating an error signal ε on the basis of the phase φ of the output signal of the demodulator and of the ideal phase $φ_o$ of this signal, means (4) for establishing the absolute value (ABS) of the error signal ε, means (2, 5, 7) for calculating an estimate of the average of the error signal ε calculated over a predetermined number of samples, from which estimate $n_{FO-RAW}$ bits are taken, means (3, 6, 8) for calculating an estimate of the average of the absolute value of the error signal ε over a predetermined number of samples, from which estimate $n_{Q-RAW}$ bits are taken, and means (10) for modelling a frequency-offset function Ω(FO-RAW, Q-RAW) on the basis of the said estimates.

4. Device according to claim 3, wherein said modelling means is an ROM memory (10) or combinatorial logic comprising a first input, connected to the output of the means (2, 7, 5) for calculating an estimate of the average of the error signal $\epsilon$ calculated over a predetermined number of samples, from which estimate $n_{FO\text{-}RAW}$ bits are taken, and a second entry, connected to the output of the means (3, 6, 8) for calculating an estimate of the average of the absolute value of the error signal $\epsilon$ over a predetermined number of samples, from which estimate $n_{Q\text{-}RAW}$ bits are taken.

5. Device according to claim 4 applied to a $\pi/4$-QPSK demodulator, wherein said means (1) for calculating the error signal $\epsilon$ on the basis of the phase $\phi$ of the output signal of the demodulator and of the ideal phase $\phi_o$ of this signal receive, on one input, the in-phase and quadrature components (I,Q) of the output signal of the demodulator and, on another output, the in-phase and quadrature components ($I_o$, $Q_o$) of the signal having ideal phase.

6. Device according to claim 3 applied to a $\pi/4$-QPSK demodulator, wherein said means (1) for calculating the error signal $\epsilon$ on the basis of the phase $\phi$ of the output signal of the demodulator and of the ideal phase $\phi_o$ of this signal receive, on one input, the in-phase and quadrature components (I,Q) of the output signal of the demodulator and, on another output, the in-phase and quadrature components ($I_o$, $Q_o$) of the signal having ideal phase.

7. Device for estimating the frequency offset in a signal received by a differential demodulator of a mobile-telephone set, comprising means (1) for calculating an error signal $\epsilon$ on the basis of the phase $\phi$ of the output signal of the demodulator and of the ideal phase $\phi_o$ of this signal, means (4) for establishing the absolute value (ABS) of the error signal $\epsilon$, means (2, 5, 7) for calculating an estimate of the average of the error signal $\epsilon$ calculating over a predetermined number of samples, from which estimate $n_{FO\text{-}RAW}$ bits are taken, means (3, 6, 8) for calculating an estimate of the average of the absolute value of the error signal $\epsilon$ over a predetermined number of samples, from which estimate $n_{Q\text{-}RAW}$ bits are taken, and means (10) for modelling a frequency-offset function $\Omega$(FO-RAW, Q-RAW) on the basis of the said estimates;

wherein the modelling of the function $\Omega$(FO-RAW, Q-RAW) representing the frequency offset consists in arbitrarily fixing the frequency error $\delta n$ at a certain known value for each n of a series of tests, FO-RAW$_n$ and Q-RAW$_n$ being the corresponding values of FO-RAW and Q-RAW, and in defining the function $\Omega$(FO-RAW, Q-RAW) by the average value of all the errors $\delta n$ such that FO-RAW=FO-RAW$_n$ and Q-RAW=Q-RAW$_n$;

wherein said means (1) for calculating the error signal $\epsilon$ on the basis of the phase $\phi$ of the output signal of the demodulator and of the ideal phase $\phi_o$ of this signal receive, on one input, the in-phase and quadrature components (I,Q) of the output signal of the demodulator and, on another output, the in-phase and quadrature components ($I_o$, $Q_o$) of the signal having ideal phase.

8. Device for estimating the frequency offset in a signal received by a differential demodulator comprising an error calculator (1) calculating an error signal $\epsilon$ on the basis of the phase $\phi$ of the output signal of the demodulator and of the ideal phase $\phi_o$ of this signal, an absolute value circuit (4) establishing the absolute value (ABS) of the error signal $\epsilon$, an estimating circuit (2, 5, 7) calculating an estimate of the average of the error signal $\epsilon$ calculated over a predetermined number of samples, from which estimate $n_{FO\text{-}RAW}$ bits are taken, an error signal circuit (3, 6, 8) calculating an estimate of the average of the absolute value of the error signal $\epsilon$ over a predetermined number of samples, from which estimate $n_{Q\text{-}RAW}$ bits are taken, and a modeling signal circuit (10) modelling a frequency-offset function $\Omega$(FO-RAW, Q-RAW) on the basis of the said estimates, wherein the modelling of the function $\Omega$(FO-RAW, Q-RAW) representing the frequency offset consists in arbitrarily fixing the frequency error $\delta n$ at a certain known value for each n of a series of tests, FO-RAW$_n$ and Q-RAW$_n$ being the corresponding values of FO-RAW and Q-RAW, and in defining the function $\Omega$(FO-RAW, Q-RAW) by the average value of all the errors $\delta n$ such that FO-RAW=FO-RAW$_n$ and Q-RAW=Q-RAW$_n$.

9. Device according to claim 8, wherein said modelling circuit is an ROM memory (10) or combinatorial logic comprising a first input, connected to the output of the estimating circuit (2, 7, 5) calculating an estimate of the average of the error signal $\epsilon$ calculated over a predetermined number of samples, from which estimate $n_{FO\text{-}RAW}$ bits are taken, and a second entry, connected to the output of the error circuit (3, 6, 8) calculating an estimate of the average of the absolute value of the error signal $\epsilon$ over a predetermined number of samples, from which estimate $n_{Q\text{-}RAW}$ bits are taken.

10. Device according to claim 8 applied to a $\pi/4$-QPSK demodulator, wherein said error calculator (1) calculating the error signal $\epsilon$ on the basis of the phase $\phi$ of the output signal of the demodulator and of the ideal phase $\phi_o$ of this signal receive, on one input, the in-phase and quadrature components (I,Q) of the output signal of the demodulator and, on another output, the in-phase and quadrature components ($I_o$, $Q_o$) of the signal having ideal phase.

* * * * *